United States Patent [19]

Stevens

[11] 4,202,430
[45] May 13, 1980

[54] BRAKE ACTUATING MECHANISMS

[75] Inventor: Roger C. Stevens, Whitton, England

[73] Assignee: Twiflex Couplings Limited, Middlesex, England

[21] Appl. No.: 882,671

[22] Filed: Mar. 2, 1978

[30] Foreign Application Priority Data

Mar. 3, 1977 [GB] United Kingdom ............... 9101/77

[51] Int. Cl.² .............................................. F16D 65/34
[52] U.S. Cl. ..................................... 188/171; 188/162
[58] Field of Search ............... 188/52, 162, 170, 171; 360/77, 93, 94; 318/40, 57

[56] References Cited

U.S. PATENT DOCUMENTS

| 1,261,771 | 4/1918 | Coldwell | 188/171 |
| 2,009,853 | 7/1935 | McDavitt | 188/171 |
| 2,410,183 | 10/1946 | Ray | 188/171 UX |
| 2,933,159 | 4/1960 | Stiebinger | 188/162 X |

FOREIGN PATENT DOCUMENTS 77699  8/1919  Austria .................................... 188/162

Primary Examiner—Duane A. Reger
Attorney, Agent, or Firm—Buell, Blenko & Ziesenheim

[57] ABSTRACT

The disclosure relates to a brake actuating mechanism in which a brake applying member is urged to apply a brake by a heavy coil spring. To release the brake a pivoted lever acts on the brake applying member and is moved in a brake releasing direction by an electric motor driven lead screw on which there is a ball-screw nut acting on the lever. The ball-screw nut causes the lead screw to spin under the load imposed by the spring through the lever so that when the motor is unlocked, the spring can apply the brake.

7 Claims, 3 Drawing Figures

BRAKE ACTUATING MECHANISMS

BACKGROUND OF THE INVENTION

1. Field of the Invention

This invention relates to brake actuating mechanisms in which braking effect is applied by spring means and there is a power driven release mechanism.

2. Description of the Prior Art

In a known brake of the above type an electro-magnet applies a force across an air gap to overcome the actuating means in order to release the brake. The electro-magnetic force decreases rapidly as magnetic gap increases so that to provide an adequate initial effort the electromagnet must be of relatively large size compared to what is required merely to hold off the actuating means when the gap has been closed. This critical relationship between magnetic gap and release force also causes the size of the gap to be critical so that adjustment of the brake requires skill and has to be repeated from time to time as wear takes place. In order to overcome this disadvantage, an automatic wear compensating mechanism is known to be used, but this still leaves the relatively ineffective use of the electro-magnet across an air gap.

In another known form of brake, an electric motor is used to provide power to drive an hydraulic pump which supplies oil or other liquid under pressure to apply a force to a piston for the purpose of releasing the brake. The motor runs continuously whilst the brake is held off, in order to maintain the oil pressure, so that there is a considerable waste of power which is dissipated as heat, resulting in the need to provide a large cooling area, a motor capable of sustained operation and therefore an actuator which is relatively costly both to manufacture and to operate. In addition the need to displace a volume of oil causes the brake to be too slow in operation for many applications.

It is an object of the invention to overcome the disadvantages of the prior known constructions as outlined above and to provide a brake actuating mechanism in which rapid brake application is provided in response to the movement of a control.

SUMMARY OF THE INVENTION

The invention provides a brake actuating mechanism comprising a drive motor, a linearly movable brake applying member, spring means to force the member in a brake actuating direction to apply the brake and a rotary to linear/linear to rotary drive connection between the motor output and the member so that the brake applying member can be driven by rotation of the motor in one direction to release the brake and, on de-energising of the motor, the brake applying member is urged by the spring means to apply the brake and, through the drive connection, the motor is rotated in the reverse direction.

Preferably the rotary to linear/linear to rotary drive connection between the motor and the member comprises a ball screw having a shaft connected to the drive motor and the nut connected to the linearly movable brake applying member.

More specifically a pivotally supported lever is provided which acts between the nut of the ball screw and the linearly movable brake applying member to transmit movement from the nut to the brake applying member and vice versa.

In any of the above arrangements, the spring means may comprise a heavy coil spring actuating on the brake applying member.

The brake applying member may include a wear compensation device for taking up wear in the brake mechanism.

In any of the above arrangements, means may be provided for locking the drive motor against rotation in a position in which the brake applying member is held in a brake "off" position against the action of the spring means.

The drive motor may be an electric motor such as an A.C. synchronous motor or a D.C. stepper motor having means for connection to an A.C./pulsed D.C. supply and to a steady D.C. supply for locking the motor against rotation and switch means are provided for switching the motor from the A.C./pulsed D.C. supply to the steady D.C. supply to lock the motor when the brake applying member is in a brake "off" position.

The switch means comprise a relay for switching over the supply to the motor from A.C./pulsed D.C. to the steady D.C. supply and a switch for energising the relay is arranged to be actuated by movement of the linear output of the drive connection into a position in which the brake actuating member is in the brake "off" position.

For example a magnetically operated proximity switch may be mounted adjacent the path of movement of the linear output of the drive connection and the magnet is mounted on the linear output to operate the proximity switch when the linear output approaches the switch in moving the brake applying member to its "off" position.

DESCRIPTION OF THE PREFERRED EMBODIMENTS

Figure 1:
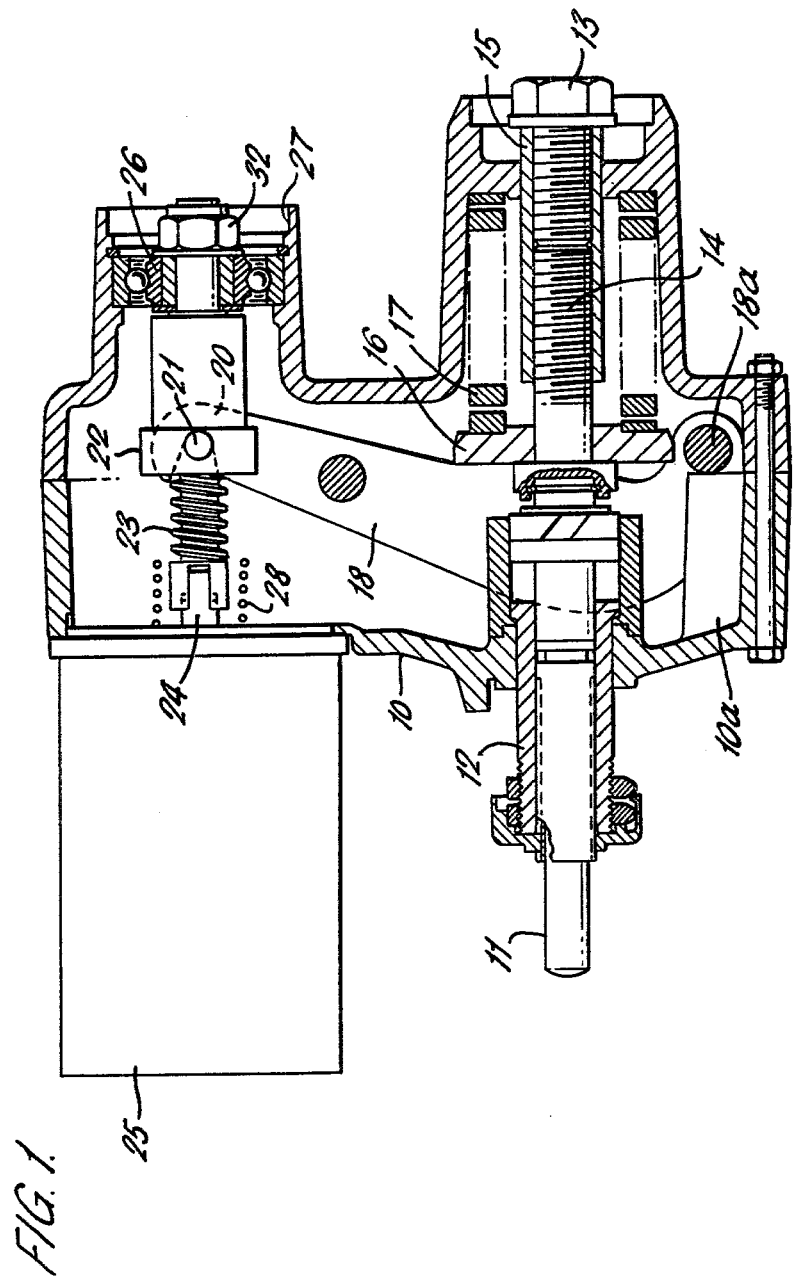
FIG. 1 is a part section part elevation view of a brake actuating mechanism.
Figure 2:
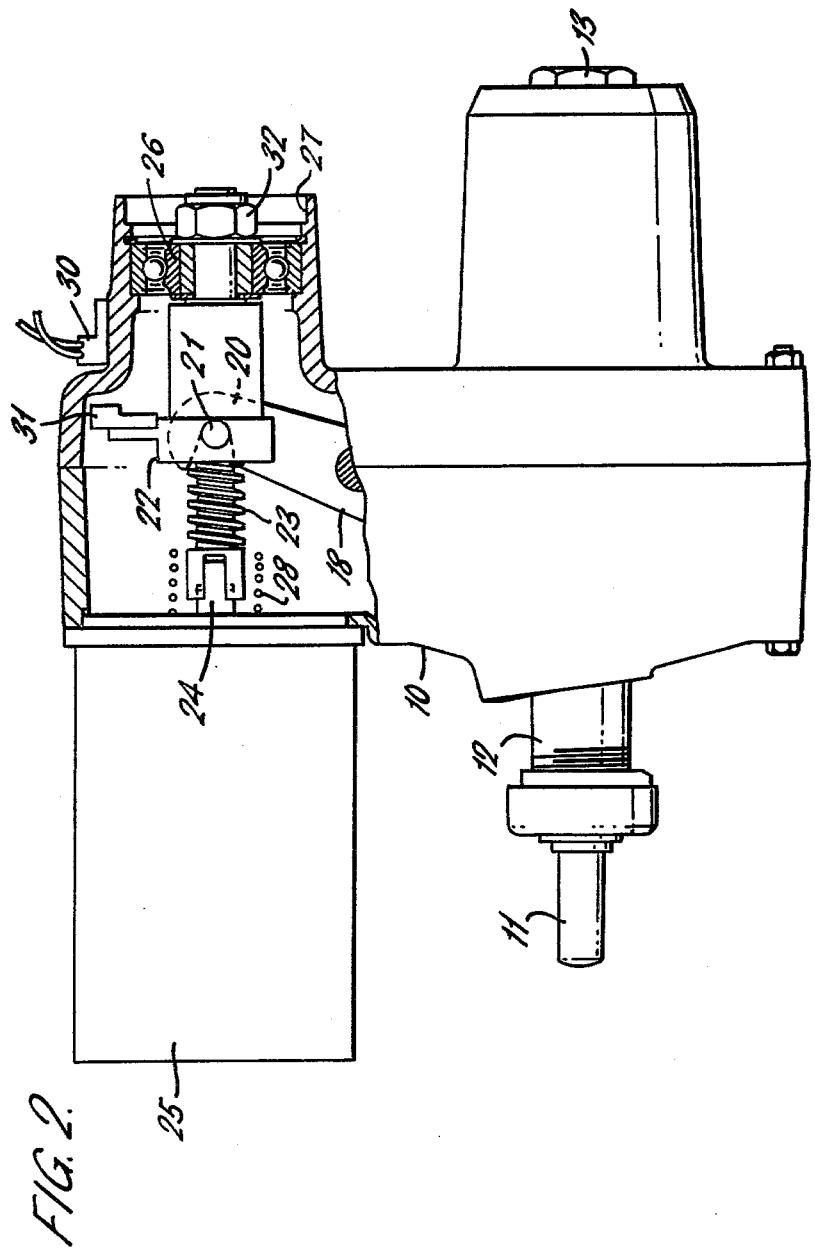
FIG. 2 shows, in detail, a part of the mechanism of FIG. 1.

Referring to FIGS. 1 and 2 of the drawings, there is shown a brake actuating mechanism comprising a housing 10 from which a push rod 11 mounted in a guide assembly 12 projects to act on a brake (not shown). Movement of the member 11 outwardly of the housing applies the brake and retraction of the member into the housing releases the brake. The push rod 11 is connected through an automatic wear compensating mechanism indicated at 13 and described more specifically in our U.K. Pat. No. 1462180 to a plunger 14 mounted in a guide sleeve 15 in the housing. The plunger 14 carries a thrust plate 16 at the end adjacent the push rod 11 and a heavy compression coil spring 17 encircling the plunger acts between the thrust plate 16 and the opposite side wall of the housing 10 to bias the member 11 outwardly of the housing.

Figure 3:
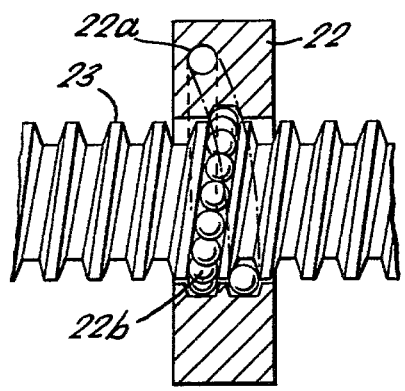
FIG. 3 is a similar view to FIG. 1 showing a modified arrangement.

A twin armed lever 18 is pivotally mounted at one end in the housing by a pin 18a on the lever which bears against a lug 10a formed in the bottom of the housing and an adjacent part of the lever bears on the thrust plate 16. The other end of the lever 18 is formed with a hook-shaped end 20 which receives a pin 21 projecting from a nut 22 of a recirculating ball screw. The ball screw is shown in greater detail in FIG. 3 and it can be seen that the nut 22 is formed with a continuous passageway 22a containing metal balls 22b. Part of the passageway defines a screw thread path for the balls in which a lead screw 23 engages. The arrangement has low inherent friction so that rotation of the lead screw displaces the nut axially and axial force on the nut causes the lead screw to turn. The lead screw 23 is connected at one end to an output shaft 24 of an A.C. electric motor 25 of high torque/low inertia such as a synchronous motor mounted on the outside of the casing 10. The other end of the lead screw is mounted in a bearing 26 fixed in an opening 27 in the casing 10. The end of the lead screw projects from the bearing and receives a nut 32 which holds the lead screw in the bearing. The lead screw can be turned manually if required by applying a spanner to the nut.

The motor has both A.C. and D.C. supplies and a control for selecting one or other supply or open circuit. Selecting A.C. supply causes the motor to drive in one direction, D.C. supply locks the motor against rotation and on open circuit the motor is free to spin in either direction.

A light return spring 28 for the nut 22 is mounted in the housing 10 around the end of the lead screw 23 adjacent the motor 25 for a purpose described later.

In the brake applied condition of the mechanism, the push-rod 11 is held projecting from the housing by the spring 17 and the nut 22 is located adjacent the motor end of the lead screw 23 and in contact with the light spring 28. To release the brake, the control for the motor is moved to energised the motor through the A.C. supply circuit. The motor then rotates in a direction to drive the nut 22 towards the bearing end of lead screw 23 as illustrated. The nut pivots the lever 18 which, in turn, retracts the push rod 11 against the action of the spring 17 to release the brake. The nut 22 is arranged to strike a limit switch (not shown) as it moves along the lead screw 23 to switch the motor control to the 'lock position' to lock the motor against the reaction torque produced in the ball screw by the force in spring 17, acting through lever 18 and the ball screw nut 22, and in which position the push rod has been withdrawn sufficiently to release the brake. The brake is then held in the "off" condition. To re-apply the brake, the motor control is moved to the open-circuit position allowing the motor and lead screw to spin freely. The axial force on the nut transmitted by the spring 17 through lever 18 forces the nut along the lead screw 23 towards the motor end, in so doing, to spin the lead screw and motor. The resulting movement of the lever 18 allows the push-rod 11 to be extended from the housing to apply the brake. As the inertia of the lead screw and the rotor of the motor is relatively low, the delay between de-energising the motor and the application of the brake is only slight. The kinetic energy of the rotating elements is transferred through the ball screw nut to the return spring 28 which finally returns the nut along the lead screw 23 pivoting lever 18 until the resistance of the spring 17 is met to remove any backlash in the mechanism. The elimination of backlash ensures that the brake comes off quickly when the motor is re-energised.

Reference is now made to FIG. 2 of the drawings which illustrates a control mechanism for locking the output of the motor 25. As indicated above, the motor is a conventional A.C. supply motor and is of the type which is locked against rotation by a D.C. supply. The motor has both A.C. and D.C. supplies as described earlier and a control for switching over from one supply to the other or to "open-circuit". The control has a relay which, when energised, is arranged to connect the D.C. supply to the motor. The relay is energised by a magnetically operated reed switch 30 mounted on the aluminium casing of the actuator mechanism at a location in the path of the movement of the nut 22 when driven by the motor in a direction to move the brake applying member in a brake releasing direction against the action of the spring 17. The nut 22 carries a permanent magnet 31 which, when it approaches the switch 30, operates the switch to energise the relay and thereby connect the D.C. supply to the motor and lock the motor. The brake is then held in the "off" position by the motor against the action of the spring 17. When it is required to release the brake, the motor control is moved to the "open-circuit" position and the motor is then free to turn. The brake is then applied and the motor spun in the reverse direction by the force of the spring 17 as described above. To release the brake again, the motor control is moved to energise the motor by the A.C. supply circuit. The motor then rotates the lead screw of the ball screw to withdraw the brake applying member against the action of the spring 17. When the nut 22 approaches the switch 30, the switch is actuated by the magnet 31 and the relay for the supply circuit control switch is switched over to re-establish the D.C. supply to the motor thus re-locking the motor.

It will be understood that many modifications may be made to the embodiment described above without departing from the scope of the invention. For example a brush D.C. motor or a D.C. stepper motor having a pulsed A.C. supply instead of the A.C. motor.

A further modification to the arrangements described above may comprise the provision of means for adjusting the pre-compression of spring 17. This may be achieved either by packing washers between the spring 17 and the housing or by means of an adjustable plug at the end of the housing against which the spring bears. Also the light spring 28 may be replaced by a rubber buffer.

I claim:

1. A brake actuating mechanism comprising a drive motor, a linearly movable brake applying member, spring means to force the member in a brake actuating direction to apply the brake, a lead screw driveably connected to the motor, a nut having a ball screw located on the lead screw to provide a rotary to linear/linear to rotary drive connection, means to connect the nut to the brake applying member, means for connecting a source of electric power to the motor to turn the motor in one direction and thereby draw the nut along the lead screw to move the brake applying member in a brake releasing direction, means for connecting a further electric power source to the motor to lock the motor electrically against rotation and means to switch the motor from the first power source to the further power source when the brake applying member has moved to a brake released position.

2. A brake actuating mechanism as claimed in claim 1 wherein a pivotally supported lever is provided which acts between the nut of the ball screw and the linearly movable brake applying member to transmit movement from the nut to the brake applying member and from the brake applying member to the nut.

3. A brake actuating mechanism as claimed in claim 1 wherein the spring means comprise a heavy coil spring actuating on the brake applying member.

4. A brake actuating mechanism as claimed in claim 1 wherein the brake applying member includes a wear compensation device for taking up wear in the brake mechanism.

5. A brake actuating mechanism as claimed in claim 1 wherein the drive motor is an A.C. synchronous motor/D.C. stepper motor having connections for an A.C./pulsed D.C. supply and a steady D.C. supply for locking the motor electrically against rotation, said switch means being provided for switching the motor from the A.C./pulsed D.C. supply to the steady D.C. supply to lock the motor when the brake applying member is in a brake "off" position.

6. A brake actuating mechanism as claimed in claim 5 wherein the switch means comprise a relay for switching over the supply to the motor from A.C./pulsed D.C. supply to the steady D.C. supply and a switch for energizing the relay is arranged to be actuated by movement of the nut into a position in which the brake actuating member is in the brake "off" position.

7. A brake actuating mechanism as claimed in claim 6 wherein the switch for energizing the relay is a magnetically operated proximity switch mounted adjacent the path of movement of the nut and said means movable with the nut for operating said switch means comprises a magnet mounted on the nut to operate the proximity switch when the nut approaches the switch in moving the brake applying member to its "off" position.

* * * * *